US011025052B2

(12) United States Patent
Roberts et al.

(10) Patent No.: US 11,025,052 B2
(45) Date of Patent: Jun. 1, 2021

(54) SCR BASED AC PRECHARGE PROTECTION

(71) Applicant: Rockwell Automation Technologies, Inc., Mayfield Heights, OH (US)

(72) Inventors: Andrew J. Roberts, Milwaukee, WI (US); Yogesh P. Patel, Grafton, WI (US); Jiangang Hu, Grafton, WI (US); Lixiang Wei, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 710 days.

(21) Appl. No.: 15/876,287

(22) Filed: Jan. 22, 2018

(65) Prior Publication Data

US 2019/0229521 A1 Jul. 25, 2019

(51) Int. Cl.
*H02H 7/125* (2006.01)
*H02H 7/122* (2006.01)
*H02M 1/36* (2007.01)
*H02H 1/00* (2006.01)
*H02M 1/32* (2007.01)
*H02H 7/12* (2006.01)
*H02P 27/06* (2006.01)
*H02M 5/458* (2006.01)
*H02M 7/219* (2006.01)

(52) U.S. Cl.
CPC ........ *H02H 7/1252* (2013.01); *H02H 1/0007* (2013.01); *H02H 7/1216* (2013.01); *H02H 7/1222* (2013.01); *H02M 1/32* (2013.01); *H02M 1/36* (2013.01); *H02M 5/4585* (2013.01); *H02M 7/219* (2013.01); *H02P 27/06* (2013.01)

(58) Field of Classification Search
CPC .... H02H 7/12–127; H02M 1/32; H02M 1/36; H02M 5/45
See application file for complete search history.

(56) References Cited

U.S. PATENT DOCUMENTS

| | | |
|---|---|---|
| 3,757,197 A | 9/1973 | Bailey |
| 4,039,914 A | 8/1977 | Steigerwald et al. |
| 4,215,304 A | 7/1980 | D'Atre et al. |
| 4,230,979 A | 10/1980 | Espelage et al. |
| 4,276,589 A | 6/1981 | Okawa et al. |

(Continued)

FOREIGN PATENT DOCUMENTS

| | | |
|---|---|---|
| CN | 201388162 Y | 1/2010 |
| CN | 104079199 A | 10/2014 |

(Continued)

OTHER PUBLICATIONS

Blaabjerg, Frede et al., "Single Current Sensor Technique in the DC Link of Three-phase PWM-VS Inverters: A Review and a Novel Solution", Citations, vol. 33, No. 5, Sep./Oct. 1997, XP-000739841.

(Continued)

*Primary Examiner* — Jared Fureman
*Assistant Examiner* — Christopher J Clark
(74) *Attorney, Agent, or Firm* — Fay Sharpe LLP

(57) ABSTRACT

Power converters, protection systems and methods to protect a precharge circuit in which a precharge resistor voltage is indirectly monitored during a normal operating mode, and a rectifier and an inverter are selectively disabled in response to the indirectly measured precharge resistor voltage indicating a fault in a precharge circuit SCR.

18 Claims, 8 Drawing Sheets

(56) References Cited

U.S. PATENT DOCUMENTS

| | | | |
|---|---|---|---|
| 4,319,177 A | 3/1982 | Kawada et al. |
| 4,496,899 A | 1/1985 | Lippitt et al. |
| 4,545,002 A | 10/1985 | Walker |
| 4,833,389 A | 5/1989 | Kovalk |
| 4,864,483 A | 9/1989 | Divan |
| 4,870,338 A | 9/1989 | Abbondanti |
| 5,005,115 A | 4/1991 | Schauder |
| 5,041,959 A | 8/1991 | Walker |
| 5,083,039 A | 1/1992 | Richardson et al. |
| 5,317,475 A | 5/1994 | Siepmann |
| 5,715,154 A | 2/1998 | Rault |
| 5,798,632 A | 8/1998 | Muljadi |
| 5,933,339 A | 8/1999 | Duba et al. |
| 5,969,957 A | 10/1999 | Divan et al. |
| 6,002,221 A | 12/1999 | Ochiai et al. |
| 6,118,676 A | 9/2000 | Divan et al. |
| 6,157,097 A | 12/2000 | Hirose et al. |
| 6,166,513 A | 12/2000 | Hammond |
| 6,166,929 A | 12/2000 | Ma et al. |
| 6,229,722 B1 | 5/2001 | Ichikawa et al. |
| 6,262,555 B1 | 7/2001 | Hammond et al. |
| 6,275,393 B1 | 8/2001 | Baudelot et al. |
| 6,301,130 B1 | 10/2001 | Aiello et al. |
| 6,377,478 B1 | 4/2002 | Morishita |
| 6,417,644 B2 | 7/2002 | Hammond et al. |
| 6,445,165 B1 | 9/2002 | Malik et al. |
| 6,646,842 B2 | 11/2003 | Pan et al. |
| 6,735,098 B2 | 5/2004 | Hussein et al. |
| 6,828,742 B2 | 12/2004 | Suzuki et al. |
| 7,158,393 B2 | 1/2007 | Schneider |
| 7,233,465 B2 | 6/2007 | Lee |
| 7,312,537 B1 | 12/2007 | Walling |
| 7,432,686 B2 | 10/2008 | Erdman et al. |
| 7,462,946 B2 | 12/2008 | Wobben |
| 7,505,291 B2 | 3/2009 | Wang et al. |
| 7,508,147 B2 | 3/2009 | Rastogi et al. |
| 7,511,385 B2 | 3/2009 | Jones et al. |
| 7,511,975 B2 | 3/2009 | Hammond |
| 7,595,563 B2 | 9/2009 | Wobben |
| 7,656,052 B2 | 2/2010 | Jones et al. |
| 7,663,260 B2 | 2/2010 | Kabatzke et al. |
| 7,679,208 B1 | 3/2010 | Ko et al. |
| 7,692,321 B2 | 4/2010 | Jones et al. |
| 7,692,325 B2 | 4/2010 | Ichinose et al. |
| 7,738,267 B1 | 6/2010 | Tallam et al. |
| 7,746,020 B2 | 6/2010 | Schnetzka et al. |
| 7,755,209 B2 | 7/2010 | Jones et al. |
| 7,816,798 B2 | 10/2010 | Hehenberger |
| 7,880,343 B2 | 2/2011 | Kleinecke et al. |
| 7,929,323 B2 | 4/2011 | Schmidt |
| 7,965,529 B2 | 6/2011 | Gibbs et al. |
| 8,030,791 B2 | 10/2011 | Lang et al. |
| 8,154,895 B2 | 4/2012 | Gilmore |
| 8,223,515 B2 | 7/2012 | Abolhassani et al. |
| 8,816,625 B2 | 8/2014 | Kopiness et al. |
| 9,673,695 B1* | 6/2017 | Li .......................... H02M 1/36 |
| 2002/0191426 A1 | 12/2002 | Hussein et al. |
| 2003/0035311 A1 | 2/2003 | Phadke |
| 2003/0063481 A1 | 4/2003 | Kojori |
| 2004/0095784 A1 | 5/2004 | Zhou |
| 2006/0232250 A1 | 10/2006 | Sihler et al. |
| 2008/0074812 A1 | 3/2008 | Oestreich et al. |
| 2008/0186750 A1 | 8/2008 | Gilmore |
| 2010/0078998 A1 | 4/2010 | Wei et al. |
| 2010/0080022 A1 | 4/2010 | Schmidt |
| 2011/0038185 A1 | 2/2011 | Swamy et al. |
| 2011/0057444 A1 | 3/2011 | Dai et al. |
| 2011/0057588 A1 | 3/2011 | Rineh et al. |
| 2013/0094258 A1* | 4/2013 | Royak .................. H02M 7/219 |
| | | 363/89 |
| 2013/0119903 A1 | 5/2013 | Weiss et al. |
| 2013/0241451 A1 | 9/2013 | Wei et al. |
| 2013/0289911 A1* | 10/2013 | Patel .................... H02M 1/126 |
| | | 702/65 |
| 2014/0292246 A1 | 10/2014 | Chae |
| 2014/0300298 A1 | 10/2014 | Liu et al. |
| 2016/0065103 A1* | 3/2016 | Glenn ...................... H02P 1/16 |
| | | 318/400.21 |

FOREIGN PATENT DOCUMENTS

| | | |
|---|---|---|
| EP | 1091478 A2 | 4/2001 |
| JP | 2002345258 A | 11/2002 |
| WO | WO 2013/094886 A1 | 6/2013 |

OTHER PUBLICATIONS

Gilmore et al., "Pre-charge Circuit Utilizing Non-Linear Firing Angle Control," Industry Applications Conference, 1996. Thirty-First IAS Annual Meeting, IAS '96., Conference Record of the 1996 IEEE, San Diego, CA 1996, pp. 1099-1105 vol. 2.

Wei et al., "Single Phase Precharge Control Method for Active Front End Rectifier," 2016 IEEE Energy Conversion Congress and Exposition (ECCE), Milwaukee, WI, 2016, pp. 1-6.

Patel et al., "Mitigation of the Effects of Common-Mode Current on the Operation of SCR-Based Rectifiers for AC Drives," 2015 IEEE Energy Conversion Congress and Exposition (ECCE), Montreal, QC, 2015, pp. 2949-2955.

\* cited by examiner

US 11,025,052 B2

SCR BASED AC PRECHARGE PROTECTION

TECHNICAL FIELD

The subject matter disclosed herein relates to power converter precharging to charge a DC bus capacitor.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Disclosed examples include power converters, protection systems and methods to protect a precharge circuit in which a precharge resistor voltage is indirectly monitored during a normal operating mode, and a rectifier and an inverter are selectively disabled in response to the indirectly measured precharge resistor voltage indicating a fault in a precharge circuit SCR.

BRIEF DESCRIPTION OF THE DRAWINGS

The following description and drawings set forth certain illustrative implementations of the disclosure in detail, which are indicative of one or more exemplary ways in which the various principles of the disclosure may be carried out. The illustrated examples are not exhaustive of the many possible embodiments of the disclosure. Various objects, advantages and novel features of the disclosure will be set forth in the following detailed description when considered in conjunction with the drawings.

DETAILED DESCRIPTION

Figure 1:
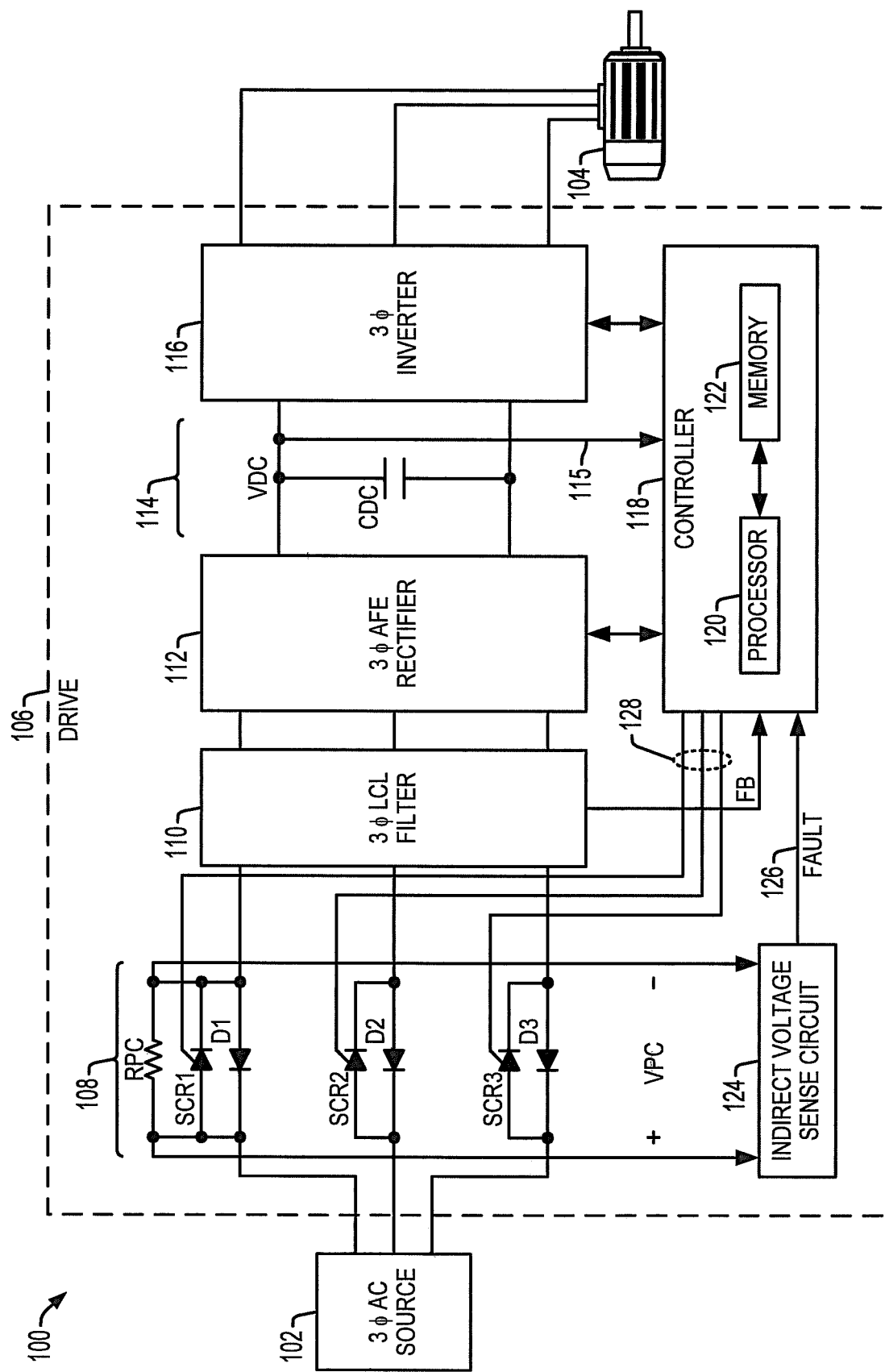
FIG. 1 is a schematic diagram.

Referring now to the figures, several embodiments or implementations are hereinafter described in conjunction with the drawings, wherein like reference numerals are used to refer to like elements throughout, and wherein the various features are not necessarily drawn to scale.

FIG. 1 shows a system 100, including an AC power source 102, a motor load 104, and a motor drive power conversion system 106. The power conversion system 106 converts AC input power from the source 102 into AC output power to drive a motor load 104. In the illustrated example, the source 102 and the load 104 are multiphase components (e.g., three phase). In other implementations, one or both of the source 102 and/or the motor load 104 can be single phase components. The power conversion system 106 includes a precharge circuit 108, a three phase filter circuit 110, a three phase active front end (AFL) rectifier 112, a DC bus circuit 114, and a three phase inverter circuit 116. In addition, the system 106 includes a controller 118 with a processor 120 and a memory 122, as well as an indirect voltage sense circuit 124. The filter circuit 110 includes an AC input to receive an AC signal from the output of the precharge circuit 108. The rectifier 112 includes a rectifier input to receive an AC input signal from an output of the filter circuit 110. The rectifier 112 has an output to provide a DC output signal (e.g., DC bus voltage signal VDC) to the DC bus circuit 114 during a normal operating mode 211. The inverter 116 converts the DC output signal VDC to an AC output signal to deliver output power to the motor load 104 during the normal operating mode 211.

The precharge circuit 108 controls charging of a DC bus capacitor CDC of the DC bus circuit 114, for example, during system power up. In the illustrated three-phase system, the precharge circuit 108 is a single phase SCR-based implementation, including an SCR and a diode for each of the three input phases. The precharge circuit 108 includes a precharge input to receive a three phase AC input signal from the source 102, as well as a three phase precharge output to deliver a three phase AC signal to the input of the rectifier circuit 112. In a first phase, the precharge circuit 108 includes an SCR SCR1 and a diode D1 connected in parallel with one another between the first phase input and the first phase output. SCR1 is coupled between the precharge input and the precharge output to selectively allow or prevent current flow from the precharge input to the precharge output, and the diode D1 is coupled between the precharge input and the precharge output to allow current flow from the precharge output to the precharge input. In addition, the first phase of the precharge circuit 108 includes a precharge resistor RPC coupled between the precharge input and the precharge output. In operation, the precharge resistor RPC controls current flow from the precharge input to the precharge output when SCR1 is off during a precharge operating mode. In a normal operating mode of the system 106, SCR1 is turned on to bypass the precharge resistor RPC. The second phase of the circuit 108 includes SCR2 and a second diode D2 between the corresponding precharge circuit input and output. The third phase includes similarly connected SCR3 and a diode D3.

The illustrated precharge circuit 108 is an SCR-based topology in which a precharge resistor RPC is provided in only a single phase of the multiphase circuit. In other implementations, one or more of the other phases can include a parallel-connected precharge resistor (not shown). SCR based precharge topologies with parallel resistors can be used in association with many different forms of motor drives and power conversion systems, generally, such as regenerative adjustable speed drives (ASDs). The precharge resistor RPC is used during precharging operation to control the inrush current during charging of the capacitor CDC, and is thereafter bypassed during normal operation of the system 106. After precharge is completed and normal drive operation is started, failure of an SCR to conduct can allow current flow through the precharge resistor RPC. In order to protect the precharge resistors from overload, example systems provide indirect techniques and apparatus to detect an SCR failure to conduct and initiate one or more remedial actions to protect the resistor, for example, by disabling the rectifier 112 and the inverter 116 of the system 106. Disclosed examples advantageously avoid or mitigate shortcomings of other approaches that directly measure the precharge resistor voltage, and provide significant advantages in terms of cost, size, and function.

Several different topologies exist for the precharge of adjustable speed drives. Each topology has its own advantages and disadvantages with respect to cost, size, and ease of implementation. Precharge circuits are employed to slowly raise the voltage across the DC bus capacitor when power is first applied to the drive. Failure to limit the rate of charge of the DC bus may cause a failure of the rectifier circuit due to high inrush current. SCR based precharge topologies offer several distinct advantages for ASD drives. These topologies are smaller and less expensive than solutions utilizing circuit breakers and contactors. Resistor-less precharging systems utilize a phase locked loop and angle control to fire the SCRs and raise the DC bus voltage. However, this requires isolated bootstrapping supplies and is generally more costly than parallel resistor precharge circuits. Another possible drawback to using SCR phase angle control is the complexity of control implementation.

The precharge circuit 108 in FIG. 1 also controls precharging of capacitors of the filter circuit 110 in addition to charging the DC bus capacitor CDC. In one example, the filter circuit 110 includes three filter circuits, one for each phase. In one example, the filter circuit 110 is an LCL filter where each phase-specific filter circuit includes two inductors and a capacitor. In one example, the inductors are connected in series with one another between the corresponding phase input and phase output, and a capacitor is connected to the node joining the two inductors. The capacitors of the three phase-specific filter circuits can be connected to one another to form a Delta circuit, or a "Y" circuit with a filter neutral node (not shown). In either configuration, the precharge circuit 108 operates to at least partially charge the capacitors of the filter circuit 110. In other examples, the individual phase-specific filter circuits can be LC circuits with a single inductor and a single capacitor per phase.

When AC voltage is initially applied to the drive 106, series resistance provided by the resistor RPC limits the current into the rectifier 110. The series resistance slows the rate of increase in the DC bus voltage VDC across the capacitor CDC. After the DC bus reaches a nominal voltage or other threshold level in a timeframe dictated by the RC time constant of the precharge circuit 108, SCR1 is turned on and bypasses the precharge resistor RPC. One limitation of using SCRs to bypass the resistor RPC is the possibility of SCR failure during normal operation. If one or more of the SCRs fail to fully conduct, the associated precharge resistor RPC again conducts current in the circuit. SCR faults while the drive is loaded cause conduction of load current through the precharge resistor RPC, potentially leading to damage or degradation of the resistor RPC. The precharge resistor RPC could be designed to handle the full load current, but such an approach is undesirable in terms of cost, size and system weight.

Several approaches are possible to detect SCR failure. One fundamental technique would be to directly measure the voltage across the precharge resistor. After precharge has completed and the SCRs take over conduction of the current into the rectifier, the voltage drop across the precharge circuit is essentially zero. Only the forward voltage of the SCR and diode is dropped across the precharge resistor. By placing a high impedance resistor string in parallel with the precharge resistor, the voltage drop on the resistor can be measured directly. Failure of the SCR to conduct will cause the resistor to carry load current. The presence of a large voltage drop after completion of precharge will indicate failure of the SCR and trigger the drive to disable its inverter and converter. However, direct voltage measurement in hardware has drawbacks, including increased cost and size. In order to directly sense the voltage across the resistor, a string of resistors can be used. However, due to voltage spacing requirements, these strings generally are large footprint additions to a printed circuit board (PCB) design. In addition, the added parts increases cost for the PCB.

Presently disclosed examples provide protection circuitry and methods to protect the precharge circuit 108 against a failure of the SCR to commutate. The example of FIG. 1 includes a protection system 118, 124 to protect the precharge circuit 108. In operation, the protection system indirectly monitors the precharge resistor voltage VPC during the normal operating mode 211, and selectively disables the rectifier 112 and the inverter 116 in response to the indirectly measured precharge resistor voltage VPC indicating a fault in SCR1. In one example, the controller 118 implements the protection functionality based on feedback signaling in the conversion system 106. In another example, the protection system also includes a sense circuit 124 that indirectly senses the precharge resistor voltage VPC. The sense circuit 124 includes an output that provides a fault signal (labeled FAULT) that indicates the presence or absence of a fault in SCR1. In a further example, the protection system selectively disables the rectifier 112 and the inverter 116 in response to the FAULT signal independent of other feedback value monitoring. In further examples, the protection system operates to selectively disable the rectifier 112 and the inverter 116 in response to one or more feedback signals or values and/or the FAULT signal from the sense circuit 124. The example protection circuitry facilitates the use of SCR precharging in combination with one or more precharge resistors RPC to provide a technical solution to mitigate or avoid technical problems of prior precharge resistor-based systems using indirect precharge resistor voltage measurement according to one or more feedback signals indicating operating parameters of the system 106 and/or an output signal from an indirect voltage sense circuit 124 that indicate a fault in an SCR (e.g., SCR1).

In operation, if an SCR fails to conduct (e.g., by loss of control or failure of the SCR itself), the precharge resistor RPC may carry all or a portion of the drive load current, and the protection system uses a measurement of the voltage VPC across the precharge resistor RPC to determine if an SCR has failed to fire. In certain implementations, the protection system takes advantage of the fact that the precharge circuit 108 charges the capacitors of the filter circuit 110 in addition to charging the DC bus capacitor the illustrated example, the circulating current through the LCL filter capacitor during the precharge operating mode is avoided due to single phase operation. Described example solutions accommodate failure modes based on feedback from the filter circuit 110 to facilitate additional protection.

Several failure modes may exist in a given power conversion system 106, and described examples are able to detect and react to diverse failure modes based on feedback and/or sense circuit signaling to protect the precharge resistor RPC and other circuits and components of the power conversion system 106. Non-limiting examples of precharge circuit faults which can cause a high voltage drop across the precharge resistor during the normal operating mode include loss of one individual phase SCR gate control signal, loss of supply which generates the control signal, failure of the gate drive for the SCR in an individual phase, failure of the gate connector to be installed during manufacturing, failure of an individual SCR to latch in the "on" state, and failure of an individual SCR antiparallel diode (e.g., D1, D2 and/or D3 in FIG. 1). In each case, the effect is a high voltage drop across the precharge resistor. The example indirect voltage sense circuit 124 in FIG. 1 facilitates isolated indirect measurement of the precharge resistor voltage VPC to protect the precharge resistor RPC against the above failure modes.

The power conversion system 106 in FIG. 1 includes a controller 118 that provides switching control signals to operate the rectifier 112 and the inverter 116 during the normal operating mode. In one example, the controller 118 also controls precharge mode operation by providing control signals to selectively turn the SCRs SCR1, SCR2 and SCR3 on and off. In one example, the controller 118 turns the SCRs off during the precharge operating mode to allow current flow through the precharge resistor RPC from the precharge input to the precharge output. In this example, the controller 118 selectively turns the SCRs on to bypass the precharge resistor RPC during the normal operating mode, and selectively discontinues operation of the rectifier 112 and the inverter 116 in response to the indirectly measured precharge resistor voltage VPC indicating a fault in one or more of the SCRs.

Figure 2:
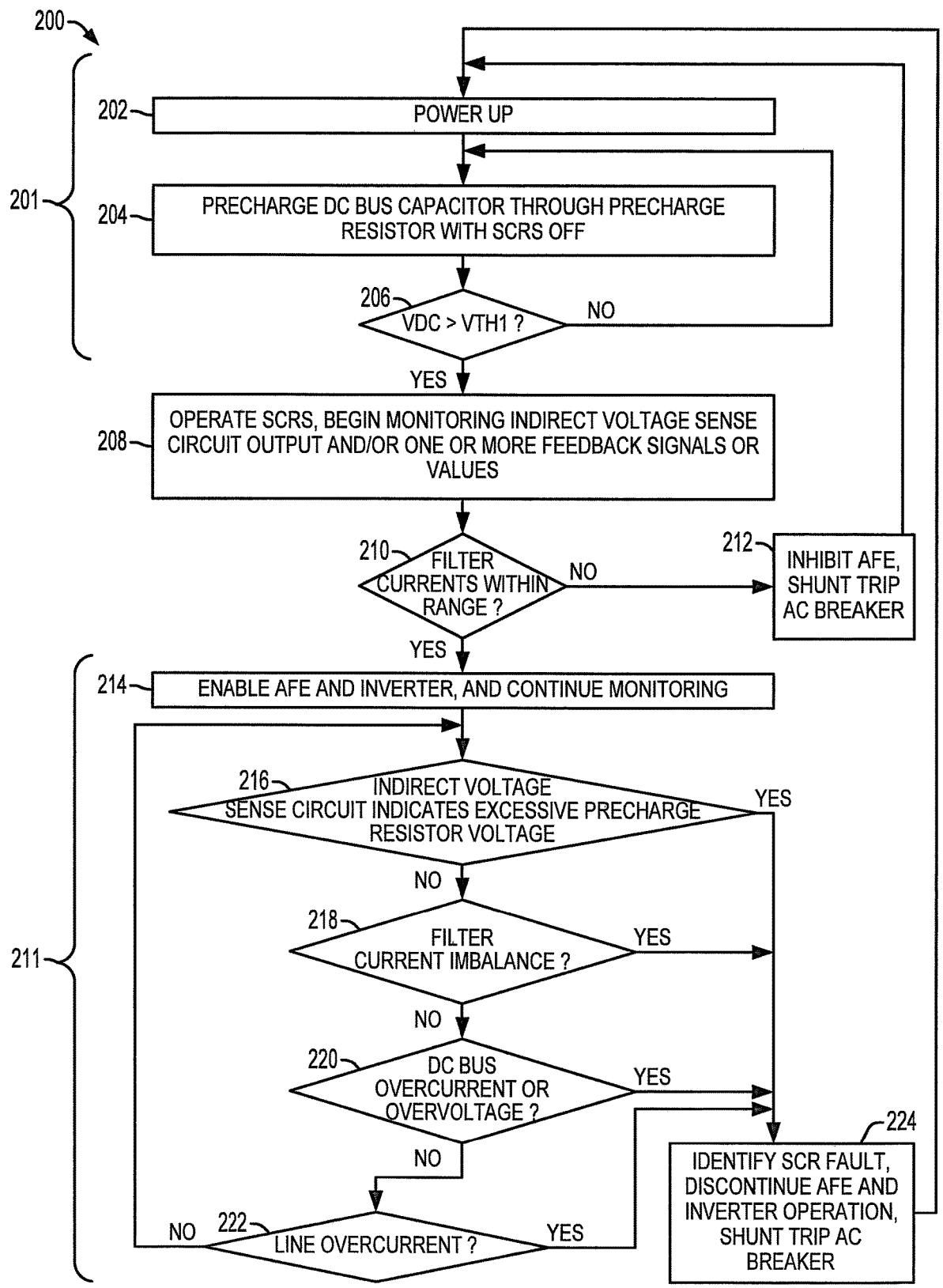
FIG. 2 is a flow diagram.

FIG. 2 illustrates a method 200 of protecting a precharge circuit 108 of a power conversion system 106. In one example, the controller 118 implements the method 200 in the example power conversion system 106 of FIG. 1, and the process or method 200 as described hereinafter in this context. The process or method 200 can be implemented in other systems (not shown) in order to protect a precharge resistor or other components of a power conversion system. The method 200 includes operation in a precharge operating mode 201. During the precharge operating mode 201, the method 200 includes powering up the system at 202. At 204, the controller 118 has output 128 to provide the SCR control signals to turn the SCRs (e.g., SCR1, SCR2 and SCR3 in FIG. 1) off. This allows current flow through the precharge resistor RPC to charge the DC bus capacitor CDC (e.g., and also to precharge one or more capacitors of the included filter circuit 110) through the precharge resistor RPC. The controller 118 in one example monitors the DC bus voltage VDC across the capacitor CDC during the precharge operating mode 201. In this example, the controller 118 determines at 206 whether the DC bus voltage VDC is greater than a first threshold VTH1. If not (NO at 206), the precharge operating mode 201 continues at 204 and 206 to charge the bus capacitor through the precharge resistor RPC.

Once the DC bus voltage VDC exceeds the first threshold VTH1 (YES at 206), the controller 118 turns the SCRs on at 208, and begins monitoring any included indirect voltage sense circuit output 126 (e.g., the FAULT signal in FIG. 1) and/or one or more feedback values. Various feedback values can be monitored at 208, including without limitation signals indicating or representing filter current imbalance and/or DC bus overvoltage or overcurrent conditions, and/or input line overcurrent conditions, etc. At 210 in FIG. 2, the controller 118 in one example determines whether measured or monitored filter currents are within a predefined range. In one example, filter current feedback signals are monitored to compute a filter current value that is compared with a predetermined range to assess the existence and amount of any current imbalance within the filter circuit 110. If the filter currents are not within the predetermined range (NO at 210), the controller inhibits the active front end rectifier and shunt trips an AC circuit breaker at 212 in order to discontinue current conduction through a suspected faulty SCR of the precharge circuit 108. The process or method 200 then returns to 202 to attempt to restart the precharge operating mode 201 as described hereinabove.

If the filter currents are determined to be within the predefined range (YES at 210), the controller 118 implements the normal operating mode, labelled 211 in FIG. 2. At 214, the controller 118 enables the active front and rectifier 112 and the inverter 116 to begin driving the motor load 104, and continues monitoring the sense circuit output 126 and/or one or more feedback signals or values. During the normal operating mode 211, the controller 118 provides switching control signals at 214 to operate the rectifier 112 and the inverter 116. The illustrated example shows operation in an implementation where the controller 118 monitors multiple feedback signals or values as well as the output 126 of the sense circuit 124. By this operation, the controller 118 monitors the precharge resistor voltage VPC during the normal operating mode 211, and the controller 118 selectively disables the rectifier 112 and the inverter 116 in response to the indirectly measured precharge resistor voltage VPC indicating a fault in one or more of the SCRs. Other implementations are possible, in which the controller 118 monitors only one of these sources, or any combination of two or more of these sources to indirectly assess the precharge resistor voltage VPC.

At 216 in the example of FIG. 2, the controller 118 determines whether the indirect voltage sense circuit 124 indicates excessive precharge resistor voltage. In one example, the circuit 124 provides the FAULT signal at the output 126 to indicate to the controller 118 that the voltage VPC across the precharge resistor RPC exceeds a second threshold voltage. In this example, the circuit 124 provides the FAULT signal at the output 126 and a first state (e.g., HIGH) when the indirectly measured precharge resistor voltage has exceeded a predetermined threshold level, and in a different second state (e.g., LOW) otherwise.

If the circuit 124 indicates excessive precharge resistor voltage (YES at 216), the controller identifies an SCR fault at 224, and takes one or more remedial actions. In one example, the controller 118 discontinues the active front end rectifier operation and inverter operation at 224, and shunt trips an AC breaker of the system 106. Thereafter, the method 200 returns to 202 for subsequent system power up to again begin the precharge operating mode 201 as described hereinabove.

If the indirect voltage sense circuit 124 does not indicate excessive precharge resistor voltage (e.g., the FAULT signal is in the second LOW state, NO at 216), the controller determines whether a threshold amount of filter current imbalance exists in the filter circuit 110 at 218. In one example, the controller 118 monitors current feedback signals (labeled "FB" in FIG. 1), and computes a single value for comparison with a predetermined range. If the single computed value is within the predetermined range, no filter current imbalances identified at 218 (NO at 218). The otherwise, if the single computed value is outside the predetermined range (YES at 218), the controller 118 determines that one or more of the SCRs is faulted, and discontinues rectifier and inverter operation at 224 as previously described. In another possible implementation, the controller 118 compares individual filter current values (e.g., three filter current values for Delta or Y configured filter capacitors, not shown) based on the feedback information, and determines whether a sufficient amount of filter current imbalance exists based on the three feedback values.

If the filter currents are sufficiently balanced (NO at 218), the controller 118 determines whether a DC bus overcurrent or overvoltage condition exists in the DC bus circuit 114 at 220 in FIG. 2. As shown in FIG. 1, the controller in one example includes an input 115 to receive a voltage feedback signal representing the DC bus voltage VDC across the DC bus capacitor CDC. The controller 118 may include a further input (not shown) to receive a DC bus current feedback signal or value. Using one or both of these example feedback signals or values, the controller 118 determines at 220 whether an overcurrent or overvoltage condition exists in the DC bus circuit 114. If so (YES at 220), the controller 118 determines that one or more of the SCRs is faulted, and the method 200 proceeds to 224 as previously described.

If no DC bus overcurrent or overvoltage condition is detected (NO at 220), the controller 118 determines at 222 whether a line overcurrent condition exists. In one example, the feedback signaling FB from the filter circuit 110 includes input line current feedback signals or values. In this implementation, the controller 118 compares the line current values with one or more thresholds to determine whether an overcurrent condition exists with respect to the monitored line current. If so (YES at 222), the controller identifies an SCR fault, discontinues rectifier an inverter operation, and shunt trips the AC breaker at 224 as described hereinabove. Otherwise (NO at 222), the controller 118 determines that no SCR fault is suspected, and the process 200 returns to 216 to again evaluate the sense circuit output and/or monitored feedback signals or values.

Figure 3:
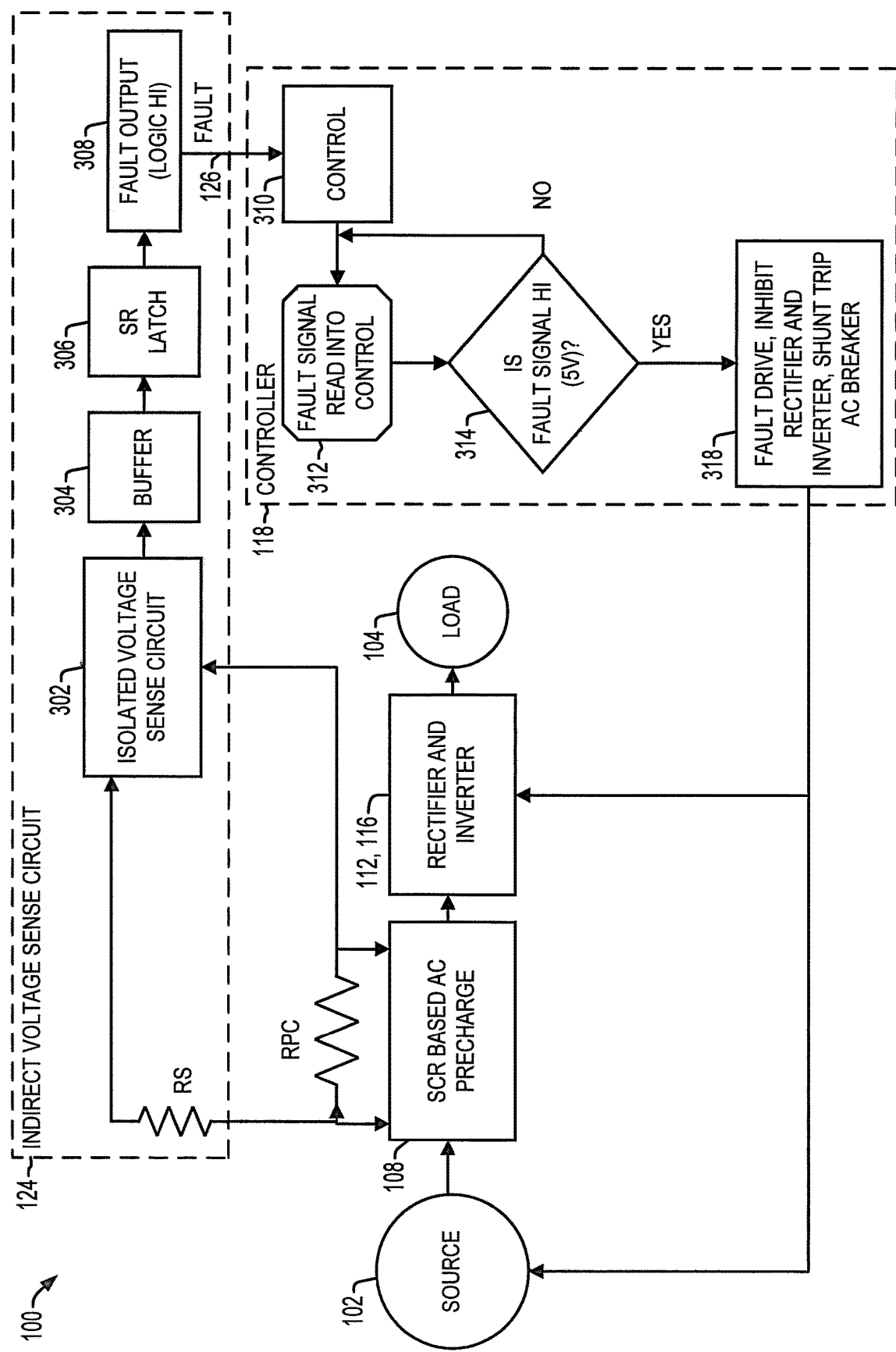
FIG. 3 is a schematic diagram.

FIG. 3 schematically illustrates one example implementation of an indirect voltage sense circuit 124 in the system 100, as well as example fault detection logic in the controller 118. The circuit 124 is connected to the two terminals of the precharge resistor RPC. As seen in the example of FIG. 3, the indirect voltage sense circuit 124 includes a sense resistor RS with a first terminal connected to a first terminal of the precharge resistor RPC, as well as a second terminal that is connected to provide a signal to an isolated voltage sense circuit 302. The second terminal of the precharge resistor RPC is also connected to the isolated voltage sense circuit 302. The sense circuit 302 provides an output signal to a buffer circuit 304. An output signal from the buffer circuit 304 is latched by a latch circuit 306 (e.g., SR latch in one example), and the latched signal is provided to an output 308 that generates the FAULT signal on the output line 126. In one example, the FAULT signal is in a first state (e.g., HIGH) when a fault is detected (e.g., one the voltage across the precharge resistor RPC exceeds a predetermined threshold), and otherwise is in a different second state (e.g., LOW). As schematically shown in FIG. 3, the controller 118 in one example includes a control function or component 310 that monitors the FAULT signal 126 from the sense circuit 124. At 312, the controller 118 reads the fault signal into a control algorithm, and determines at 314 whether the FAULT signal is active HIGH (e.g., 5 V). If not (NO at 314), the fault signal monitoring continues. In response to an active HIGH FAULT signal (YES at 314), the controller 118 faults the drive at 318, inhibits the rectifier an inverter, and activates a shunt trip AC breaker (e.g., at 224 in the method 200 of FIG. 2 above).

Figure 4:
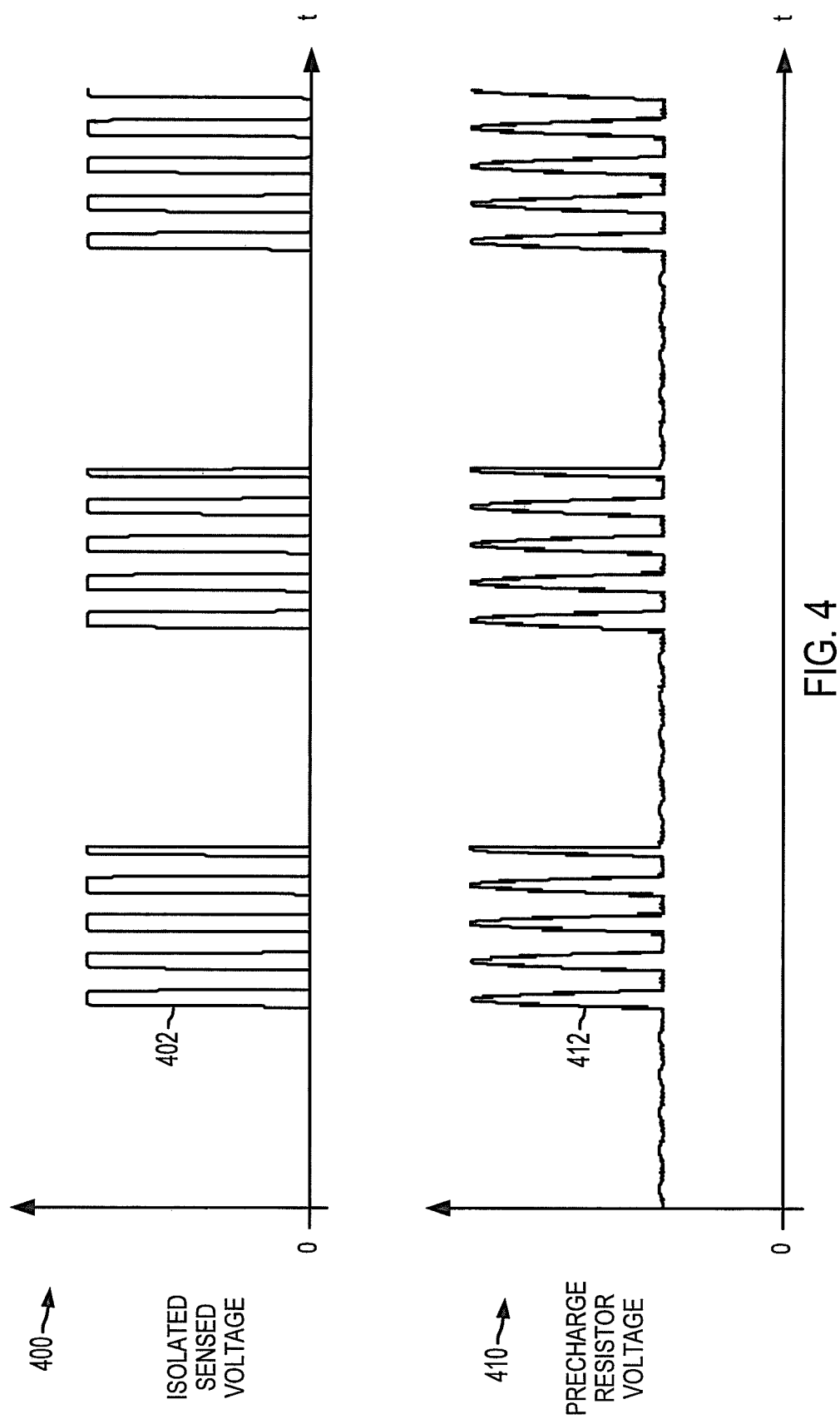
FIG. 4 is a signal diagram

FIG. 4 includes a graph 400 that shows an isolated sensed voltage curve 402, as well as a graph 410 that shows a precharge resistor voltage curve 412 in operation of the power conversion system 106. This example indirect measurement by the circuit 124 provides a qualitative indication of whether there is a significant non-zero voltage across the precharge resistor (e.g., a voltage greater than the diode drop of a properly working associated SCR). The sense resistor RS operates as a current limiting resistor in series with the isolated sensing circuit that is coupled in parallel with the precharge resistor RPC. In the event of an SCR failure, the voltage across the precharge resistor RPC will rise above a suitable threshold (e.g., rising edges in the curve 412 of FIG. 4). The current limiting sense resistor RS in one example is sized such that it can carry the bias current to an opto-isolator or other isolated sense circuit 302 in the presence of a voltage able to overload the precharge resistor. In one example, the isolated voltage sense circuit 302 converts the high voltage across the precharge resistor RPC into an active high logic indication of an overload on the precharge resistor (e.g., the isolated sensed voltage curve 402 in one example varies between 0-5 V), and in one example a clipping circuit (not shown) is used to shape the waveform into square pulses.

Figure 5:
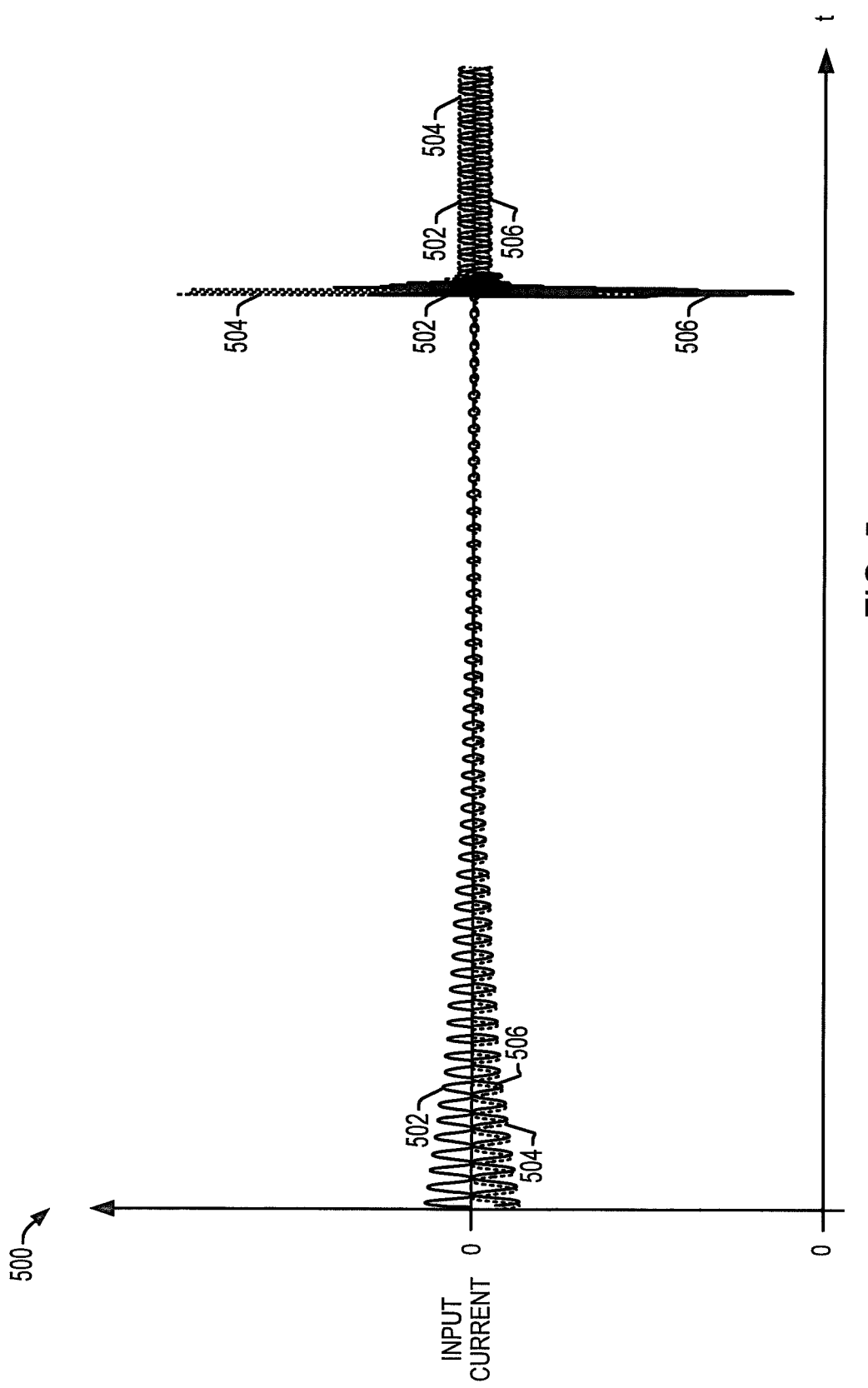
FIG. 5 is a signal diagram.

FIG. 5 shows a graph 500 with three phase input line current curves 502, 504 and 506 for the three inputs of the precharge circuit 108 (e.g., the currents received from the source 102). During the initial precharge operational mode (e.g., 201 in FIG. 2), current feedback signals can be used to identify any suspected SCR faults and protect the precharge resistor RPC based on the input line currents shown in FIG. 5. This advantageously uses feedback already available for the control of the active front end rectifier 112 to determine whether the SCRs have failed, and thus an implementation using this technique alone adds no cost or size to the power conversion system 106. As previously mentioned, other implementations can also use currently available filter capacitor current feedback signals, DC bus voltage and/or feedback signals, or other signals used for control purposes in operation of the system 106 in order to implement precharge resistor protection without additional cost. During precharge in the example of FIG. 1, the input currents are unipolar, as shown in the initial portion of the curves 502, 504 and 506 in FIG. 5. This is because only a single phase parallel resistor RPC is used. The return current is shared between the other two phases and conducted through the corresponding anti-parallel diodes.

In the illustrated example, the curve 502 shows positive current flow through the precharge resistor, and the curves 504 and 506 in this example illustrate return current flowing through the diodes D2 and D3 during the precharge operating mode. As the DC bus capacitor CDC (e.g., and any capacitors of the filter circuit 110) gradually charge, the amplitude of the current signals shown in curve 502, 504 and 506 correspondingly decrease. Once the precharging is completed, the controller 118 turns the SCRs on. Activation of the SCRs causes the initial current signal transient in FIG. 5, after which all three phases undergo bidirectional (e.g., bipolar) substantially sinusoidal current flow in the normal operating mode.

In one example, the protection system monitors whether the input current and/or LCL current feedback are bipolar and balanced within certain predefined ranges to verify that the SCRs are correctly commutating (e.g., at 210 in FIG. 2 above). Once the SCRs have been verified, then the converter and inverter can be enabled (e.g., 214 in FIG. 2) and the power conversion system 106 can be loaded by operating the rectifier 112 and the inverter 116 to drive a motor load 104. If an SCR failure occurs while the system 106 is loaded and running, the example single precharge resistor RPC re-enters the circuit in only one phase. The resistor RPC is not part of the control model, and the three phase input impedance to the drive 106 becomes imbalanced. The impedance imbalance leads to imbalance in the input and LCL capacitor current, which can be detected by the disclosed examples. Overcompensation in the rectifier control can lead to input overcurrent and overvoltage on the DC bus which can also be detected using pre-existing feedback signaling in the system 106 (e.g., VDC feedback signal at the controller input 115). One some or all of these can be monitored during the normal operating mode, and detection of such can be used by the controller 118 to disable the drive loads.

Figure 6:
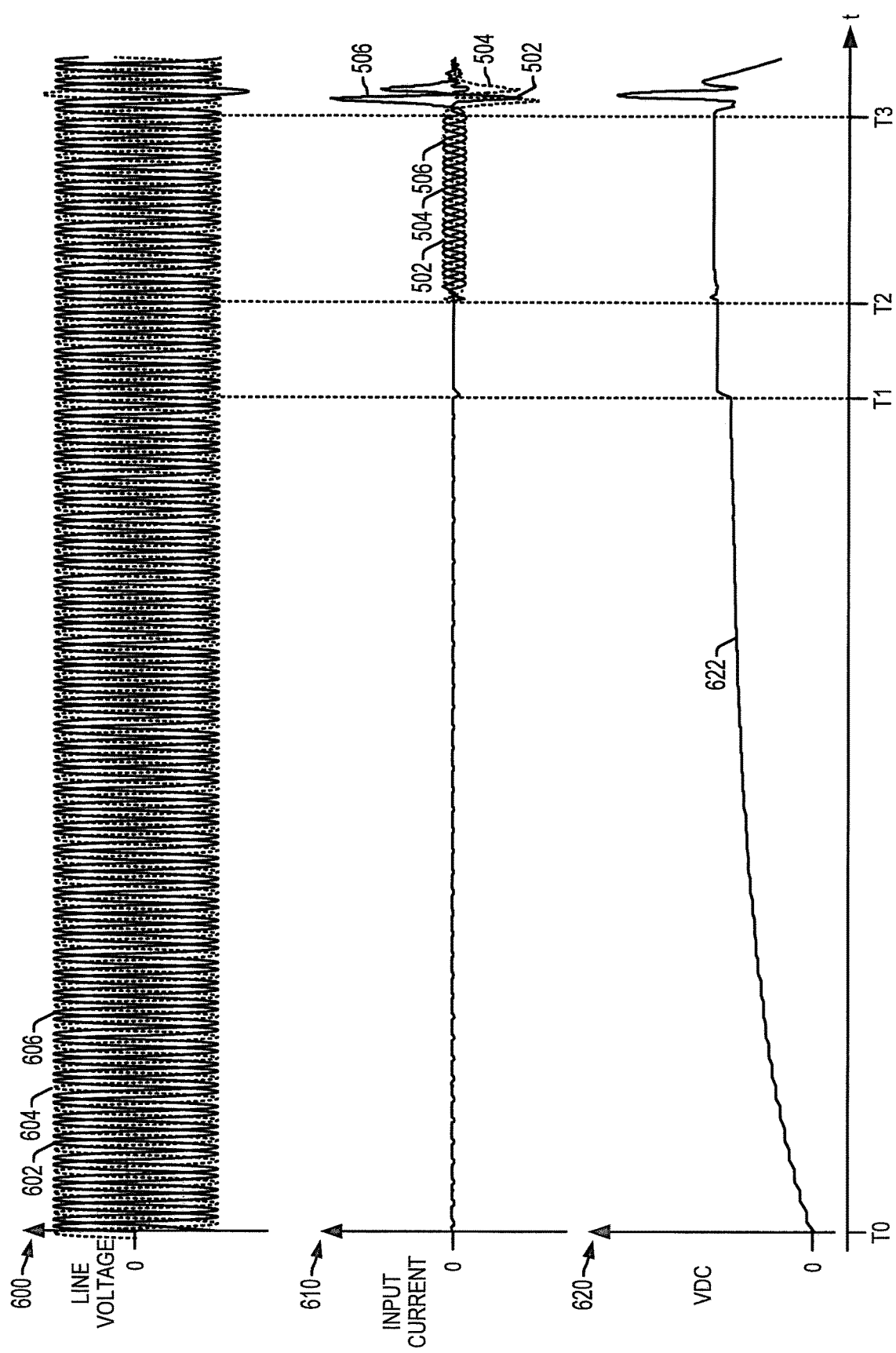
FIG. 6 is a signal diagram.
Figure 7:
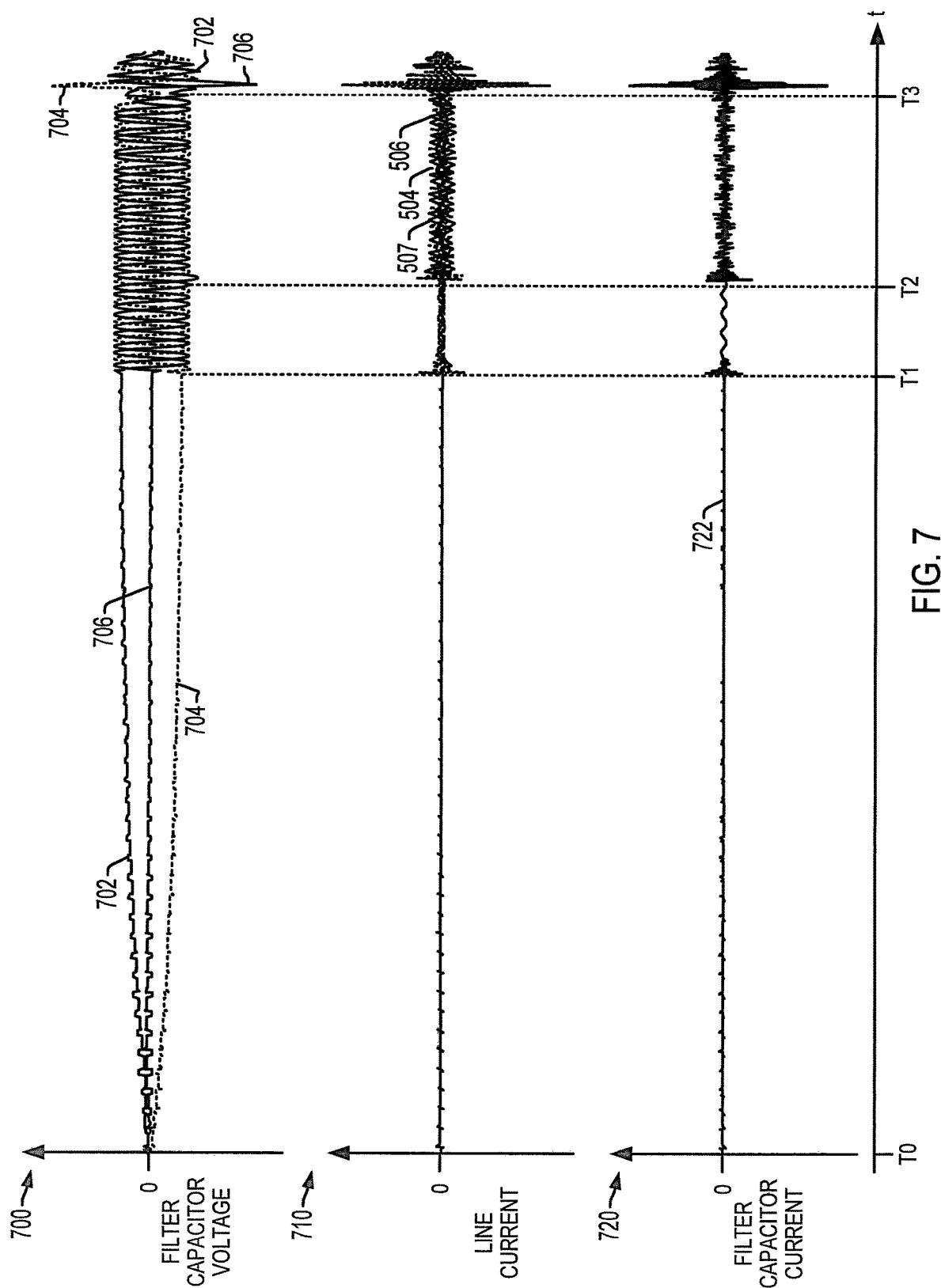
FIG. 7 is a signal diagram.

FIGS. 6 and 7 show simulation results illustrating operation in response of described precharge resistor protection system examples. In these examples, the drive 106 is precharged beginning at T0 and the SCRs are turned on at T1 after the DC bus voltage VDC has risen to an appropriate predetermined threshold level (e.g., VTH1 in FIG. 2 above). Shortly after SCR commutation begins, the rectifier 112 and the inverter 116 are enabled at T2. At T3, the SCR (e.g., SCR1 in FIG. 1) parallel to the precharge resistor RPC is disabled. The behavior of the DC bus voltage, input current, LCL filter capacitor voltage and current are illustrated after the failure of the SCR. FIG. 6 includes a graph 600 with curve 602, 604 and 606 respectively corresponding to the line voltages from the three phase AC source 102. A graph 610 in FIG. 6 provides curves 502, 504 and 506 that illustrate the input line current signals (e.g., also shown in FIG. 5 above). FIG. 6 further illustrates a graph 620 showing a curve 622 representing the DC bus voltage VDC in the system 106.

A graph 700 in FIG. 7 illustrates curves 702, 704 and 706 illustrating three example filter capacitor voltage curves in the filter circuit 110, and a graph 710 shows the corresponding input (e.g., line) current curves 502, 504 and 506 (also shown in FIGS. 5 and 6). In addition, FIG. 7 includes a graph 720 with a filter capacitor current curve 722 representing the current into a filter capacitor (not shown) between first and second phases of the filter circuit 110. The simulated results of FIGS. 6 and 7 follow the expected response described above. In particular, when SCR1 fails, a DC bus overvoltage occurs in response (e.g., curve 622 in FIG. 6). Input and capacitor currents spike exceeding overcurrent limits, as shown in the graphs 610, 710 and 720. The input currents are also unipolar and not balanced following an SCR fault parentheses e.g., after T3 in the graph 610. Using the above-described protection systems and the method 200, a failure of an SCR is predictable by indirectly measuring the precharge resistor voltage VPC through monitoring of signals already being used within the control algorithm.

Figure 8:
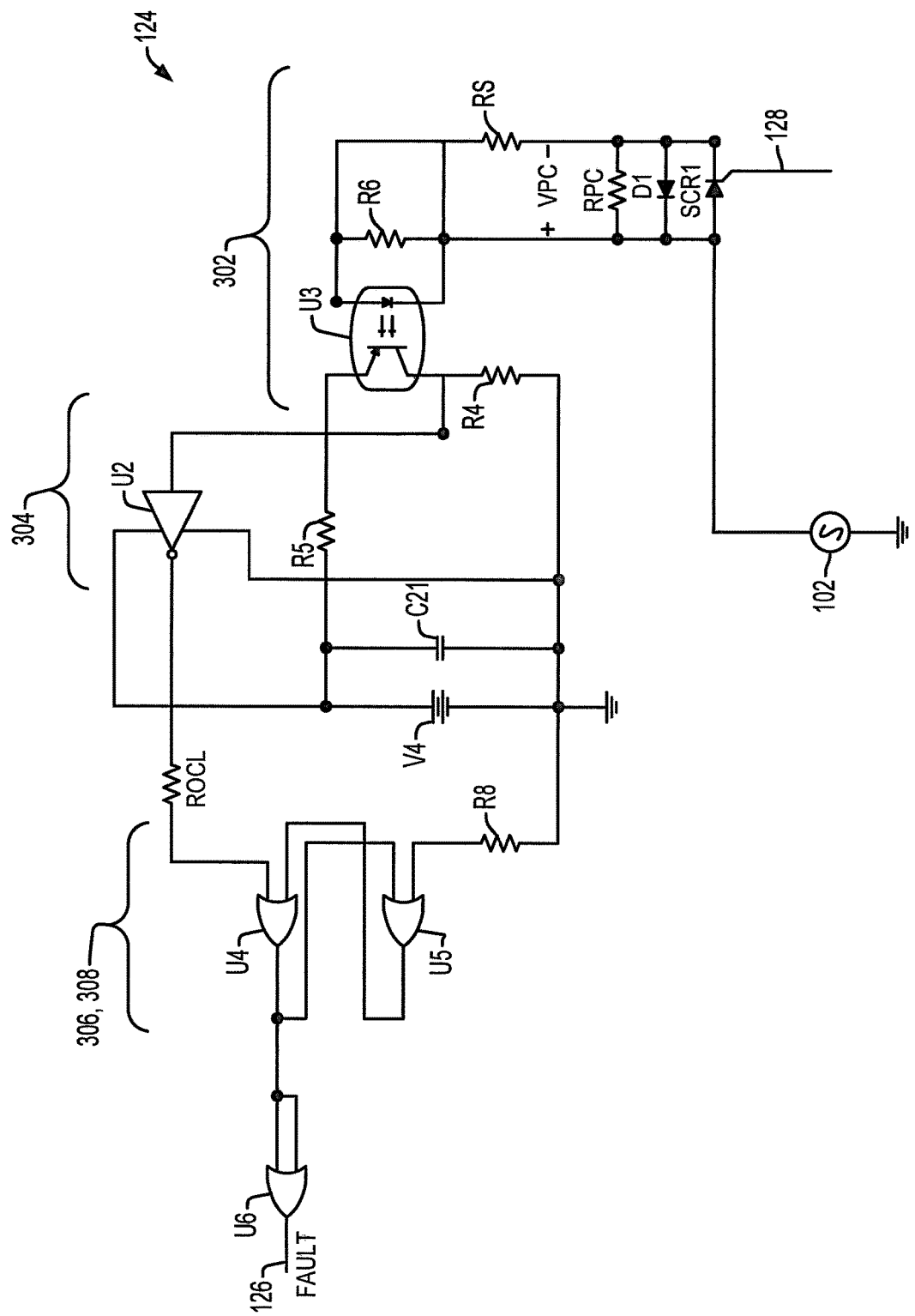
FIG. 8 is a schematic diagram.

FIG. 8 illustrates an example indirect voltage sense circuit 124. The isolated sense circuit 302 in this example includes input lines connected to the first and second terminals of the precharge resistor RPC (e.g., parallel with SCR1 and diode D1), as well as a sense resistor RS. The first terminal of RS is connected to the recharge resistor RPC, and the second terminal of RS is connected to the anode of an input diode of an optocoupler U3. The cathode of the optocoupler diode is connected to the precharge resistor RPC, and a resistor R6 is connected in parallel with the input diode. The output transistor of the optocoupler U3 is biased to a supply voltage V4 (e.g., 5 V in one example) by a resistor R5. A capacitor C21 stabilizes the supply voltage V4. The isolated sense circuit 302 includes a buffer amplifier U2 that receives a voltage input signal from the emitter of the optocoupler transistor and a resistor R4. An output of the buffer amplifier U2 provides a signal through a resistor ROCL to an input of a first OR gate U4. A second OR gate U5 has a first input grounded through a resistor R8, and a second input connected to the output of U4. The second input of the OR gate U4 is connected to the output of U5. The gates U4 and U5 provide a latch and output circuit 306, 308, and a buffer gate U6 provides the output 126 to generate the FAULT signal.

In response to an SCR fault, the circuit 306, 308 latches the buffer circuit output signal and provide the fault signal FAULT in a first state (e.g., HIGH) indicating a fault in the SCR, or in a second state (e.g., LOW) indicating no fault in the SCR. When the SCR fails, a high voltage is dropped across the precharge resistor RPC. This turns ON the optocoupler diode. The optocoupler acts as an isolated means of sensing the precharge resistor voltage VPC. When the optocoupler diode is on, the optocoupler transistor is also ON. When the transistor is ON, the voltage across R4 at the optocoupler output (into the buffer amplifier U2) is high (e.g., 5 V) and the SR latch (e.g., U4 and U5) latches a fault bit ON. The FAULT signal is provided to the controller 118 via the output 126 and the controller 118 inhibits the rectifier 112 and the inverter 116 in response to protect the precharge resistor RPC.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled in the art to practice the disclosed subject matter, including making and using any devices or systems and performing any incorporated methods. It will be evident that various modifications and changes may be made, and additional embodiments may be implemented, without departing from the broader scope of the present disclosure as set forth in the following claims, wherein the specification and drawings are to be regarded in an illustrative rather than restrictive sense.

The following is claimed:
1. A power conversion system, comprising:
a precharge circuit to control charging of a DC bus capacitor of a DC bus circuit, the precharge circuit including a precharge input to receive an AC input signal, a precharge output to deliver an AC signal, an SCR coupled between the precharge input and the precharge output to selectively allow or prevent current flow from the precharge input to the precharge output, a diode coupled between the precharge input and the precharge output to allow current flow from the precharge output to the precharge input, and a precharge resistor coupled between the precharge input and the precharge output to control current flow from the precharge input to the precharge output when the SCR is off during a precharge operating mode;
a filter circuit, including an AC input to receive an AC signal from the output of the precharge circuit;

a rectifier, including a rectifier input to receive an AC input signal from an output of the filter circuit, and an output to provide a DC output signal during a normal operating mode;
an inverter to convert the DC output signal to an AC output signal to deliver output power to a load during the normal operating mode; and
a protection system to protect the precharge circuit, the protection system configured to indirectly monitor a precharge resistor voltage during the normal operating mode, and selectively disable the rectifier and the inverter in response to the indirectly measured precharge resistor voltage indicating a fault in the SCR, the protection system including a sense circuit to indirectly sense the precharge resistor voltage and to provide a fault signal indicating the presence or absence of a fault in the SCR, the sense circuit including:
a sense resistor, including a first terminal connected to a first terminal of the precharge resistor, and a second terminal,
an optocoupler, including an optocoupler diode connected between a second terminal of the sense resistor and a second terminal of the precharge resistor, and an output transistor,
a bias resistor connected in parallel with the optocoupler diode to set a turn-on voltage of the optocoupler diode,
a buffer circuit to receive a signal from the output transistor of the optocoupler and to provide a buffer circuit output signal according to the signal from the output transistor, and
an output circuit to latch the buffer circuit output signal and provide the fault signal in a first state indicating a fault in the SCR, or in a second state indicating no fault in the SCR.

2. The power conversion system of claim 1, wherein the protection system is configured to selectively disable the rectifier and the inverter in response to a feedback signal indicating an imbalance in filter currents of the filter circuit.

3. The power conversion system of claim 2, wherein the protection system is configured to selectively disable the rectifier and the inverter in response to a feedback signal indicating an overvoltage or overcurrent condition in the DC bus circuit.

4. The power conversion system of claim 3, wherein the protection system is configured to selectively disable the rectifier and the inverter in response to a feedback signal indicating an input line overcurrent condition.

5. The power conversion system of claim 2, wherein the protection system is configured to selectively disable the rectifier and the inverter in response to a feedback signal indicating an input line overcurrent condition.

6. The power conversion system of claim 1, wherein the protection system is configured to selectively disable the rectifier and the inverter in response to a feedback signal indicating an overvoltage or overcurrent condition in the DC bus circuit.

7. The power conversion system of claim 6, wherein the protection system is configured to selectively disable the rectifier and the inverter in response to a feedback signal indicating an input line overcurrent condition.

8. The power conversion system of claim 1, wherein the protection system is configured to selectively disable the rectifier and the inverter in response to a feedback signal indicating an input line overcurrent condition.

9. The power conversion system of claim 1, further comprising a controller configured to provide switching control signals to operate the rectifier and the inverter during the normal operating mode, turn the SCR off during the precharge operating mode to allow current flow through the precharge resistor from the precharge input to the precharge output, selectively turn the SCR on to bypass the precharge resistor during the normal operating mode, and selectively discontinue operation of the rectifier and the inverter in response to the indirectly measured precharge resistor voltage indicating a fault in the SCR.

10. A protection system to protect a precharge circuit of a power conversion system, the protection system comprising:
a circuit to indirectly monitor a precharge resistor voltage during a normal operating mode, and selectively disable a rectifier and an inverter in response to the indirectly measured precharge resistor voltage indicating a fault in a precharge circuit SCR, the circuit including:
a sense resistor, including a first terminal connected to a first terminal of the precharge resistor, and a second terminal,
an optocoupler, including an optocoupler diode connected between a second terminal of the sense resistor and a second terminal of the precharge resistor, and an output transistor,
a bias resistor connected in parallel with the optocoupler diode to set a turn-on voltage of the optocoupler diode,
a buffer circuit to receive a signal from the output transistor of the optocoupler and to provide a buffer circuit output signal according to the signal from the output transistor, and
an output circuit to latch the buffer circuit output signal and provide the fault signal in a first state indicating a fault in the SCR, or in a second state indicating no fault in the SCR.

11. The protection system of claim 10, wherein the protection system is configured to selectively disable the rectifier and the inverter in response to a feedback signal indicating an imbalance in filter currents of the filter circuit.

12. The protection system of claim 11, wherein the protection system is configured to selectively disable the rectifier and the inverter in response to a feedback signal indicating an overvoltage or overcurrent condition in the DC bus circuit.

13. The protection system of claim 12, wherein the protection system is configured to selectively disable the rectifier and the inverter in response to a feedback signal indicating an input line overcurrent condition.

14. The protection system of claim 11, wherein the protection system is configured to selectively disable the rectifier and the inverter in response to a feedback signal indicating an input line overcurrent condition.

15. The protection system of claim 10, wherein the protection system is configured to selectively disable the rectifier and the inverter in response to a feedback signal indicating an overvoltage or overcurrent condition in a DC bus circuit.

16. The protection system of claim 15, wherein the protection system is configured to selectively disable the rectifier and the inverter in response to a feedback signal indicating an input line overcurrent condition.

17. The protection system of claim 10, wherein the protection system is configured to selectively disable the rectifier and the inverter in response to a feedback signal indicating an input line overcurrent condition.

18. The protection system of claim 10, further comprising a controller configured to provide switching control signals to operate the rectifier and the inverter during the normal operating mode, turn the SCR off during a precharge operating mode to allow current flow through the precharge resistor from a precharge input to a precharge output, selectively turn the SCR on to bypass the precharge resistor during the normal operating mode, and selectively discontinue operation of the rectifier and the inverter in response to the indirectly measured precharge resistor voltage indicating a fault in the SCR.

* * * * *